United States Patent [19]

Bachovchin

[11] 4,343,764
[45] Aug. 10, 1982

[54] NUCLEAR REACTOR CONTROL COLUMN

[75] Inventor: Dennis M. Bachovchin, Plum Borough, Pa.

[73] Assignee: The United States of America as represented by the United States Department of Energy, Washington, D.C.

[21] Appl. No.: 144,748

[22] Filed: Apr. 28, 1980

[51] Int. Cl.³ .............................................. G21C 7/16
[52] U.S. Cl. ................................................... 376/338
[58] Field of Search ................ 176/86 R, 22, 35, 36 R

[56] References Cited

U.S. PATENT DOCUMENTS

| 3,192,123 | 6/1965 | Costes et al. | 176/86 R |
|---|---|---|---|
| 3,228,847 | 1/1966 | Parkinson et al. | |
| 3,287,910 | 11/1966 | Silverstein | 176/35 |
| 3,347,747 | 10/1967 | West et al. | 176/86 R |
| 3,660,231 | 5/1972 | Fox et al. | 176/86 R |
| 4,120,753 | 10/1978 | Malaval | 176/86 R |

FOREIGN PATENT DOCUMENTS

| 612009 | 1/1961 | Canada | 176/86 R |
|---|---|---|---|
| 1079235 | 4/1960 | Fed. Rep. of Germany | 176/22 |

OTHER PUBLICATIONS

"Fluidization & Fluid–Particle Systems", Reinhold Pub. Corp., N.Y., Zenz et al., pp. 41–44, (1960).

Primary Examiner—Harvey E. Behrend
Attorney, Agent, or Firm—L. A. DePaul

[57] ABSTRACT

The nuclear reactor control column comprises a column disposed within the nuclear reactor core having a variable cross-section hollow channel and containing balls whose vertical location is determined by the flow of the reactor coolant through the column. The control column is divided into three basic sections wherein each of the sections has a different cross-sectional area. The uppermost section of the control column has the greatest cross-sectional area, the intermediate section of the control column has the smallest cross-sectional area, and the lowermost section of the control column has the intermediate cross-sectional area. In this manner, the area of the uppermost section can be established such that when the reactor coolant is flowing under normal conditions therethrough, the absorber balls will be lifted and suspended in a fluidized bed manner in the upper section. However, when the reactor coolant flow falls below a predetermined value, the absorber balls will fall through the intermediate section and into the lowermost section, thereby reducing the reactivity of the reactor core and shutting down the reactor.

5 Claims, 3 Drawing Figures

NUCLEAR REACTOR CONTROL COLUMN

GOVERNMENT CONTRACT

This invention was conceived in the course of or under Contract No. EY-76-C-02-3045M with the U.S. Department of Energy.

BACKGROUND OF THE INVENTION

This invention relates to automatic control systems for nuclear reactors and particularly to automatic shutdown systems for nuclear reactors.

All nuclear reactors incorporate an emergency shutdown system which comprises a device for reducing the reactivity of the nuclear reactor core. The reduction in reactivity of the nuclear reactor core is generally accomplished by way of introducing a form of neutron absorbing material into the nuclear reactor core. These systems are intended to be simple and reliable systems for quickly introducing neutron absorbing material into the core of the nuclear reactor for effecting a shutdown of the reactor. The basic method known in the prior art for controlling a nuclear reactor is the system comprising control rods. In this system the control rods are raised and lowered by mechanical mechanisms into and out of the nuclear reactor core for controlling the amount of reactivity in the core. In an emergency situation, the control rods are released such that they fall into the reactor core area thus reducing the reactivity of the core and shutting down the reactor. While this system has proven to be extremely reliable, additional backup systems have been proposed as a redundant emergency reactor control system.

As an alternate method of reactor control, the use of neutron absorbing balls has been suggested. In one such control system, the apparatus comprises a restraint mechanism for releasably restraining a multitude of discrete bodies of materials which are magnetic and possess neutron absorbing properties. The restraints means comprises at least one pair of magnetic pole pieces of opposite polarity, the apparatus being operated to release the discrete bodies by demagnetization of the pole pieces, whereby the bodies are moved under the influence of gravity into the core of the reactor. Another such control system is that disclosed in U.S. Pat. No. 4,076,583, issued in the name of Ash et al. In the control mechanism according to Ash et al, a plurality of conduits defines a fluid flow path and comprises a first section located within and extending through the core of the reactor, and a second section located exteriorly of the core and positioned above the first section. Each of the conduits contains a plurality of substantially spherical bodies in a sufficient quantity to substantially fill the first section of each of the conduits. The conduits are provided with a first fluid connection to a lower part of the first section and a second fluid connection to the upper part of the second section for the passage of a pressurized fluid therethrough while maintaining the reactor in operation. The nuclear reactor further comprises a means for supplying the pressurized fluid to the first fluid connection for moving all of the plurality of bodies from the first section to the second section of each of the elongated conduits to form a hydraulically stacked bed of spherical bodies. The bypass mechanism is located intermediate of the second fluid connection, in the second section of each of the conduits and includes a plurality of fluid passageways distributed along the length of the second section for permitting a portion of the pressurized fluid to bypass a portion of the stacked bed of bodies during normal operation of the reactor.

In most of the hydraulically supported absorber ball systems, the reactor coolant flow lifts the absorber material out of the core area and wedges them into the upper region of the control assembly. The resulting wall friction and low void fraction retard the tendency of the balls to fall when the flow is reduced below a single ball support velocity. At some level of reduced coolant flow, the combined effects of fluid drag and wall friction are not able to support the weight of the stack of balls and the insertion of the absorber balls occurs. In order to reduce the pressure loss to permissible levels a partial coolant bypass tube is generally inserted into the stack. These systems have certain limitations. One of the limitations of these systems is that due to the wall friction and low void fraction, the insertion of the absorber balls does not occur until the reactor coolant flow is reduced to less than 25% of full flow. In many circumstances, it is desirable for the absorber balls to be inserted at a greater percentage of full reactor coolant flow. Another disadvantage of these systems is that the drop speed of the stack of absorber balls is limited by the friction-opposed sliding of the stack as well as by the expected reactor coolant flow coast-down curve. In addition, during startup of the nuclear reactor, these systems are susceptible to premature stacking and consequent inability to fully raise the balls because of excessive fluid by-passing. Moreover, in these systems there is a probability of allowing the absorber balls to become jammed in the upper section of the column which may cause permanent wedging of the stack and a subsequent failure to respond to fluid flow reductions.

Therefore, what is needed is a nuclear reactor control column that is capable of automatically shutting down a nuclear reactor when the flow of reactor coolant falls below a predetermined limit.

SUMMARY OF THE INVENTION

The nuclear reactor control column comprises a column disposed within the nuclear reactor core having a variable cross-section hollow channel and containing spherical balls whose vertical location is determined by the flow of the reactor coolant through the control column. The control column is divided into three basic sections wherein each of the sections has a different cross-sectional area. The uppermost section of the control column has the greatest cross-sectional area, the intermediate section of the control column has the smallest cross-sectional area, and the lowermost section of the control column an intermediate cross-sectional area. In this manner, the area of the uppermost section can be established such that when the reactor coolant is flowing under normal conditions therethrough, the absorber balls will be suspended in a fluidized bed in the upper section. However, when the reactor coolant flow falls below a predetermined value, the absorber balls will fall through the intermediate section and into the lowermost section, thereby reducing the reactivity of the reactor core and shutting down the reactor. The cross-sectional area of the three sections can be chosen such that under normal flow conditions the absorber balls are maintained in a fluidized bed fashion in the upper section, but when the flow of reactor coolant falls below a predetermined level, the absorber balls will fall into the lower section of the control column.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

While the present control rod systems have proven to be extremely reliable in the control of nuclear reactors, additional redundant control systems are being proposed for use in conjunction with these and other control systems for nuclear reactors. The invention described herein provides a means by which a nuclear reactor can be automaticaly and safely controlled in response to changes in the flow of reactor coolant.

Figure 1:
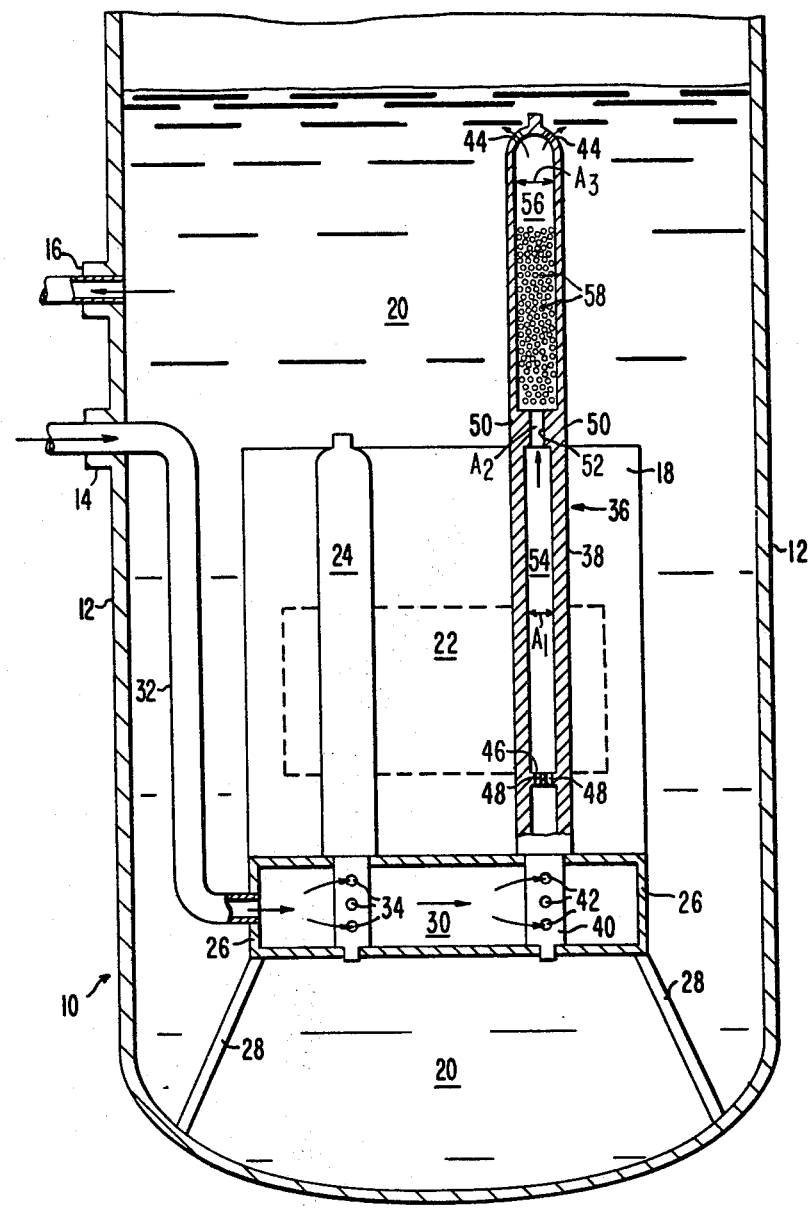
FIG. 1 is a cross-sectional view in elevation of a nuclear reactor having a control column and with the absorber balls in the fluidized bed upper section.

Referring to FIG. 1, the nuclear reactor is referred to generally as 10 and comprises a reactor vessel 12 having an inlet 14 and an outlet 16 disposed thereon. A core 18 is disposed within reactor vessel 12 and is surrounded by reactor coolant 20 which may be a liquid metal such as liquid sodium. Core 18 has a central region 22 wherein the greatest reactivity of the core occurs. The reactor core 18 comprises a plurality of fuel assemblies 24 which may be chosen from those well-known in the art. Fuel assemblies 24 are supported by lower core support 26 which may be attached to the bottom of reactor vessel 12 by means of supports 28. Lower core support 26 defines an inlet plenum 30 therewithin. A flow directing means such as conduit 32 may be attached to inlet 14 and to lower core support 26 for conducting the reactor coolant through inlet 14 and into inlet plenum 30. Fuel assemblies 24 have first openings 34 disposed in the lower section thereof and in fluid communication with inlet plenum 30 such that the flow of reactor coolant 20 through inlet plenum 30 may enter fuel assemblies 24. Once the reactor coolant has entered fuel assemblies 24, the coolant flows upwardly through fuel assemblies 24 and out through the top thereof. In this manner, heat is transferred from fuel assemblies 24 to reactor coolant 20 in a manner well understood in the art.

Still referring to FIG. 1, a plurality of control columns 36 are also disposed within reactor vessel 12 and within core 18. Control column 36 comprises a generally cylindrical housing 38 having an inlet nozzle 40 attached to the lower end thereof. Inlet nozzle 40 has a plurality of first holes 42 dispersed therein and is arranged such that inlet nozzle 40 is disposed within inlet plenum 30. Housing 38 also has a plurality of second holes 44 disposed in the top end of housing 38. A first plate 46 is disposed within housing 38 and has a plurality of orifices 48 disposed therein for allowing the reactor coolant to pass therethrough but narrow enough to prevent neutron absorbing material from passing therethrough. A second plate 50 having a channel 52 therethrough is also located in housing 38 and above first plate 46. A first section 54 is defined between first plate 46 and second plate 50. The cross-sectional area of first section 54 is referred to as $A_1$. A second section 56 of control column 36 is defined between the top portion of housing 38 and second plate 50. The cross-sectional area of channel 52 is referred to as $A_2$ and the cross-sectional area of the second section 56 is referred to as $A_3$. A plurality of neutron absorbing balls 58 which may be tantalum balls are disposed within housing 38.

Figure 2:
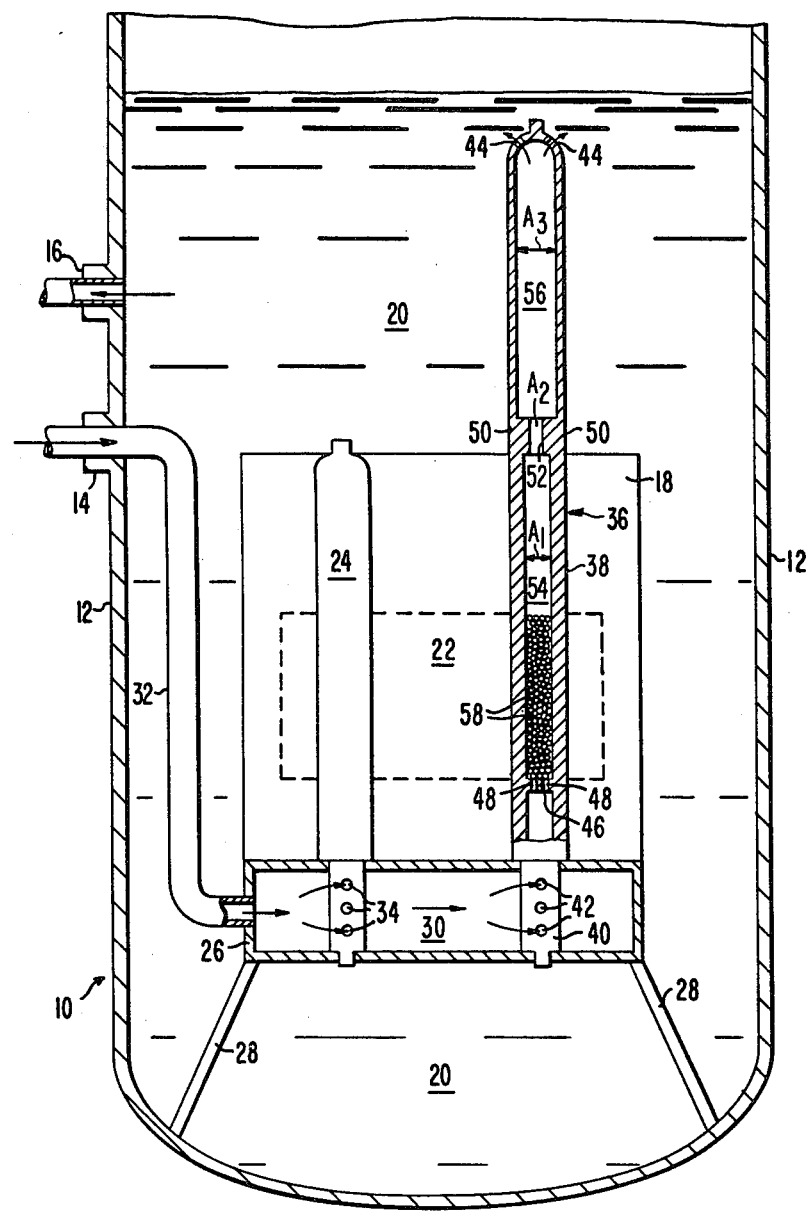
FIG. 2 is a cross-sectional view in elevation of a nuclear reactor wherein the reactor coolant flow has been reduced and the absorber balls have fallen into the lower section of the control column.

The reactor coolant enters nuclear reactor 12 through inlet 14 and flows through conduit 32 into inlet plenum 30. From inlet plenum 30 the reactor coolant enters first openings 34 in fuel assemblies 24 and flows through the fuel assemblies 24. The reactor coolant also enters first holes 42 in inlet nozzle 40 of control column 36 and flows into housing 38. The reactor coolant in housing 38 flows through first orifices 48 in first plate 46 and enters first section 54 of control column 36. The reactor coolant flows from first section 54 through channel 52 in plate 50 and into second section 56 of control column 36. From second section 56 of control column 36 the reactor coolant exits housing 38 through second holes 44. The reactor coolant then exits reactor vessel 12 by means of outlet 16. When the flow of reactor coolant through housing 38 is of a sufficient magnitude, balls 58 are lifted into and remain in a fluidized bed configuration in second section 56. However, when the flow of reactor coolant falls below a predetermined level, balls 58 fall from second section 56 through channel 52 and into first section 54 as shown in FIG. 2. When in the configuration as shown in FIG. 2, balls 58 rest on first plate 46 and fill first section 54 so as to greatly reduce the reactivity of core 18. In this manner, when the flow of reactor coolant through reactor vessel 12 falls below a predetermined level, balls 58 fall to a location in core 18 wherein the reactivity of the core is greatly reduced thus automatically shutting down the nuclear reactor.

In the invention as described herein, the selection of appropriate relative values for cross-sectional areas $A_1$, $A_2$ and $A_3$ is very important. In the concept of the present invention, it is important that the cross-sectional area of $A_3$ be greater than the cross-sectional area of $A_1$ and which in turn be greater than the cross-sectional area of $A_2$. Depending on the selected value for the normal reactor coolant flow rate, cross-sectional area $A_3$ is to be chosen such that the reactor coolant fluid velocity does not exceed the ball 58 terminal velocity in second section 56 so that the balls 58 reside in second section 56 in an expanded fluidized bed relationship. By establishing an expanded fluidized bed of balls 58 in second section 56 by the selection of cross-sectional area $A_3$ large enough, this system prevents the wedging of balls 58 in second section 56 and eliminates problems associated with the wedging of balls 58 in the upper portion of a control column. The cross-sectional area $A_2$ of channel 52 should be chosen such that the linear fluid velocity in this section is substantially larger than the settling velocity of balls 58 during normal reactor operation so that balls 58 cannot return to first section 54 under these conditions. The cross-sectional area $A_2$ of channel 52 should be selected to give the desired drop point as a fraction of the total lift flow rate of the reactor coolant. With this invention, insertion of absorber material can be made to begin at a flow rate of approximately 50% of full reactor coolant flow by the proper selection of cross-sectional area $A_2$. This provides the great advantage of having the reactor automatically shut down when the reactor coolant flow reaches approximately 50% of full flow rather than at a time where the reactor coolant is at a much lower flow rate. When compared with the similar drop point of the prior art, the fluidized system described herein will exhibit a superior drop time compared to the stacked ball system for a given reactor coolant coast-down curve. The present system has an additional advantage in that it eliminates the need for a bypass tube which precludes premature or incomplete stacking behavior. In addition, the gently agitated nature of the liquid fluidized bed system makes the probability of permanent jamming of balls 58 much lower than in the wedged stacked systems of the prior art. Moreover, the pressure drop experienced in the present system is limited to the weight of the absorber balls because the balls are not pinned against the upper grid.

The present system has additional advantages in that the shapes of the cross-sectional areas $A_1$, $A_2$ and $A_3$ are irrelevant to the operation of the system. In addition, the centers of the three cross-sectional areas need not be aligned. The basic requirements of the system are that the three cross-sectional areas $A_1$, $A_2$ and $A_3$ should be arranged with $A_3$ above $A_2$ and with $A_2$ above $A_1$. In addition, all of the cross-sectional areas $A_1$, $A_2$ and $A_3$ should constitute a common flow channel. Preferably, $A_3$ should be approximately twice the cross-sectional area of $A_1$ and the cross-sectional area $A_2$ should be approximately 0.90 of the cross-sectional area of $A_1$ for insertion at 50 percent of full reactor coolant flow. Preferably, $A_3$ should be chosen by the following formula:

$$A_3 \geq (2.5 \, A_1 \times H_1)/H_3)$$

Where:

$H_1$ is the height of first section 54; and
$H_3$ is the height of second section 56.

In the present design, the reactor coolant superficial velocity through first section 54 should be (at full coolant flow) greater than the terminal velocity of absorber balls 58. It is also important that the cros-sectional area $A_3$ be chosen large enough that at full coolant flow;

1. The terminal velocity of an individual absorber ball is not exceeded by the superficial fluid velocity in that section; and 2. The fluidized bed does not expand sufficiently that its upper surface contacts the upper portion of control column 36.

The cross-sectional area of channel 52, $A_2$, should be chosen so that the superficial fluid velocity in channel 52 at the minimum desirable operating coolant flow just balances the free-fall velocity of balls 58. The flow rate at which this balancing occurs is the insertion flow rate of the system. When the coolant flow rate is reduced to slightly lower than this value, balls 58 will fall into first section 54 and will automatically shut the reactor down.

Figure 3:
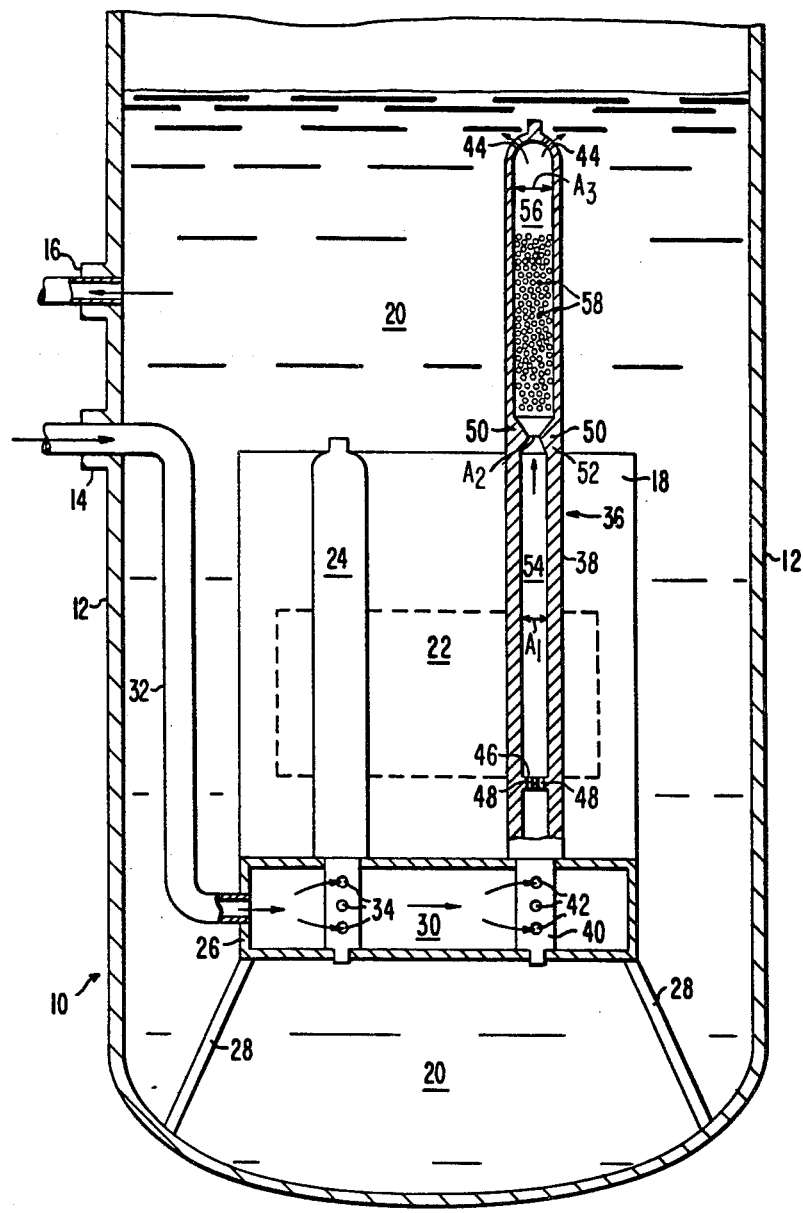
FIG. 3 is a cross-sectional view in elevation of a nuclear reactor having an alternate design of the control column.

As shown in FIG. 3, channel 52 can be constructed to have a negligible height as long as its cross-sectional area is chosen properly.

Therefore, it can be seen that the invention provides a control column for automatically shutting down a nuclear reactor in response to reduced coolant flow.

I claim:

1. In a nuclear reactor having a reactor core and a control column, said control column comprising:

a generaly cylindrical housing capable of being disposed within a nuclear reactor core and having a plurality of openings in the top thereof;

an inlet nozzle attached to the lower end of said housing and having a plurality of holes therein for conducting a reactor coolant therethrough;

a plurality of neutron absorbing balls disposed in said housing and capable of being supported by the flow of reactor coolant;

a first plate having orifices therein and disposed within said housing near the lower end thereof;

a second plate having a channel therethrough and disposed within said housing above said first plate thereby defining a first section between said first plate and said second plate and a second section between said second plate and the top of said housing, said second section having a cross-sectional area larger than said first section with said first section having a cross-sectional area larger than the cross-section area of said channel and with the volume of said second section being approximately 2.5 times the volume of said first section, the flow of reactor coolant through said housing being sufficient to suspend said plurality of neutron absorbing balls in said second section in a fluidized bed fashion when said reactor cooling flow is above a predetermined limit and whereby said neutron absorbing balls fall into said first section when said reactor coolant flow falls below said predetermined limit thereby effecting a shutdown of the nuclear reactor.

2. The nuclear reactor control column according to claim 1 wherein said cross-sectional area of said channel is approximately 90 percent of the cross-sectional area of said first section.

3. The nuclear reactor control column according to claim 2 wherein said predetermined limit is greater than 25 percent of full reactor coolant flow.

4. The nuclear reactor control column according to claim 3 wherein said predetermined limit is approximately 50 percent of full reactor coolant flow.

5. The nuclear reactor control column according to claim 4 wherein said neutron absorbing balls are tantalum balls.

* * * * *